United States Patent [19]

Yoo

[11] Patent Number: 4,936,670
[45] Date of Patent: Jun. 26, 1990

[54] AUTOMATIC REARVIEW MIRROR FOR VEHICLE

[76] Inventor: Jae P. Yoo, 113, Namdang-Ri, Biin-Myun, Seocheon-Goon, Choongcheongnam-Do, Rep. of Korea

[21] Appl. No.: 361,022

[22] Filed: Jun. 2, 1989

[30] Foreign Application Priority Data

Jun. 3, 1988 [KR] Rep. of Korea ............... 6650/1988

[51] Int. Cl.$^5$ ..................... G02B 7/18; B60R 1/02
[52] U.S. Cl. ..................... 350/604; 350/637; 350/582; 248/480
[58] Field of Search ............... 350/604, 605, 606, 626, 350/632, 633, 637, 639, 582; 248/476, 479, 480

[56] References Cited

U.S. PATENT DOCUMENTS

| 3,977,774 | 8/1976 | O'Sullivan | 350/627 |
| 4,685,779 | 8/1987 | Gonzalez | 350/637 |
| 4,728,180 | 3/1988 | Janowicz | 350/637 |

FOREIGN PATENT DOCUMENTS

| 3207925 | 9/1983 | Fed. Rep. of Germany | 350/627 |
| 0145039 | 11/1980 | Japan | 350/626 |
| 0004440 | 1/1982 | Japan | 350/604 |

Primary Examiner—Eugene R. LaRoche
Assistant Examiner—R. D. Shafer
Attorney, Agent, or Firm—Todd A. Dawson; William F. Pinsak

[57] ABSTRACT

An automatic rearview mirror for vehicles which is capable of constricting the rearview mirror when it is not used, and capable of drawing out the rearview mirror only when it is required. The rearview mirror comprising an external housing, an internal housing, a protecting glass plate, a mirror plate, packing and scraper, a motor, and two servomotors for adjusting the angle of mirror plate. The external housing is fixed to the interior of the front quarter vent or on the bonnet, and the internal housing is drawn out of the external housing and inserted therein by switching operations performed by the driver. The protecting glass plate is cleaned every time the internal housing is drawn out of and constricted into the external housing by the scraper attached to the opening edge of the external housing so that the mirror can be easily cleaned.

5 Claims, 6 Drawing Sheets

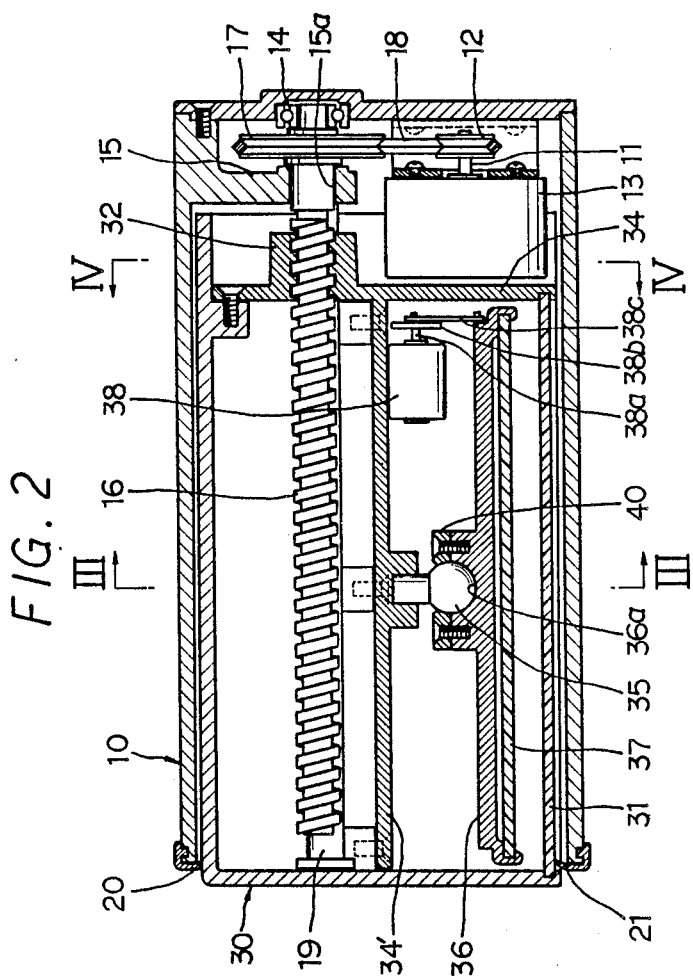

AUTOMATIC REARVIEW MIRROR FOR VEHICLE

BACKGROUND OF THE INVENTION

The present invention relates to an automatic rearview mirror for a vehicle, and in particular to an automatic rearview mirror capable of drawing out the rearview mirror to the outside of a car body only in case when it is required, and the rearview mirror can be retracted into the car body either in case of parking or in case that the rearview mirror is not required to be exposed to the outside of a car body such as a proximate crossing of cars, or in case that there is a worry of damage due to the contact with other physical object by the protrusion of rearview mirror.

Rearview mirrors being known and used in general are either fixed respectively at right and left of the front portion of bonnet or mounted to protrude at proximities of front quarter vent of right and left side doors. Since such conventional rearview mirrors, particularly in case of a passenger car, are protruded to the outside of a car, there has been a problem that they are easily damaged due to contact with other car upon crossing of cars either at a narrow space or at a crowded road. In case of running when it is raining, snowing or running on the unpaved road with much dust, and when the dust, rain or snow is smeared on the surface of rearview mirror, they have to be cleaned normally, therefore, there has been also a problem that it is not only inconvenience but also it causes a difficulty for running of a car when it is severe.

Further, in adjusting the angle of rearview mirror, a case adjusting method in which a mirror plate of rearview mirror is fixed to a case and entire case is turned so that the angle can be adjusted, and a mirror plate adjusting method in which a case is fixed to a car body and only a mirror plate within the interior is moved so that the angle can be adjusted, are used, however, because both of these two methods are manually carried out in adjusting the angle of mirror surface, there has been also a problem of troublesome in handling.

SUMMARY OF THE INVENTION

Therefore, it is an object of the present invention to provide an automatic rearview mirror for vehicles which is comprised of an external housing mounted fixedly at the interior of a car body and an internal housing provided with a mirror plate which is inserted into the interior of said external housing and capable of moving in sliding manner to the interior and exterior of the car body, thereby the mirror plate can be drawn out in case it is required.

Another object of the present invention is to provide an automatic rearview mirror for vehicles which a protecting glass plate mounted at the exterior of the mirror plate of rearview mirror is rendered to be cleaned by a scaper of soft rubber material attached to the opening edge of the external housing when the internal housing is slidably moved so that, even if dust or drops of rain or snow is smeared, they can be easily removed.

Still another object of the present invention is to provide an automatic rearview mirror for vehicles that the mirror angle of rearview mirror can be automatically adjusted by a switch operation in a state that a driver is seating on the driver's seat such as during the running of a car.

According to the preferred embodiment of the present invention having these objects, the automatic rearview mirror comprises: an external housing mounted either at the bonnet of vehicle or at interior of car body of front quarter vent; an internal housing which is inserted into the interior of said external housing, and movement in sliding manner is possible, and having a mirror plate and transparent glass plate for protecting said mirror plate at front surface portion; a scraping means of soft rubber material which is attached to the opening edge of said external housing, and cleaning the protecting glass plate when the internal housing is slidably moved; a motor for moving which is mounted at the interior of closed end portion of said external housing; a screw shaft which is rotated by said motor for moving, and moving the internal housing, and a follower engaged therewith; a fixing plate which is pivotably mounted at the center of laterally-directed partitioning wall of said internal housing, and is provided with a mirror plate on the front surface thereof; and first and second servomotors which are mounted on both sides of one end side of said partitioning wall so as to adjust the pivoting angle of said fixing plate.

BRIEF DESCRIPTION OF THE DRAWINGS

For a better understanding of the invention, and to show how the same may be carried out into effect, reference will now be made, by way of example, to the accompanying drawings, in which:

FIG. 2 is a longitudinal cross sectional view showing a state that the internal housing of FIG. 1 is completely inserted into the internal of the external housing;

DETAILED DESCRIPTION OF THE INVENTION

Figure 1:
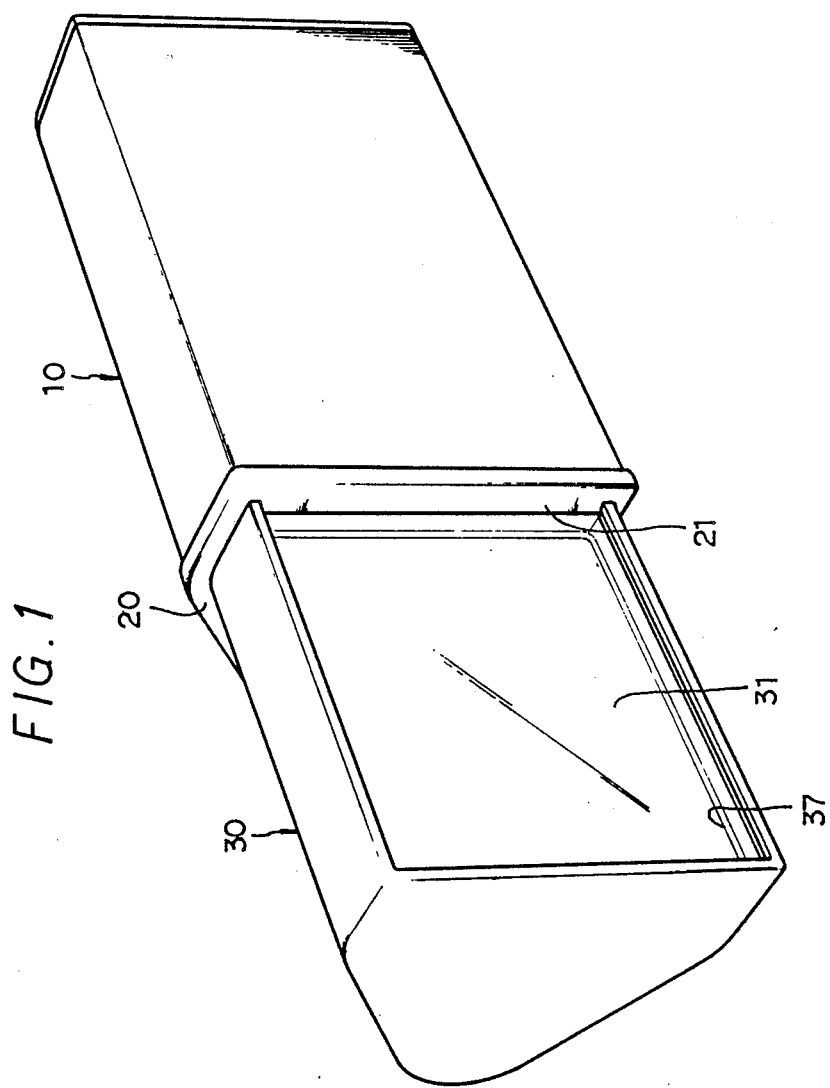
FIG. 1 is a perspective view showing a state that an internal housing of an automatic rearview mirror for vehicles according to the present invention is drawn to exterior.

Throughout the drawing, like reference numerals are used to designate like or equivalent parts or portions, for simplicity of illustration and explanation.

In FIG. 1 reference numeral 10 shows an external housing which is opened in one side end portion and closed in other side end portion and having a front surface of flat plate shape and a rear portion of substantially semi circular shape in section, in which an internal housing 30 having a protecting glass plate 31 at front surface is movably inserted in sliding manner into the interior of said external housing 10.

Figure 4:
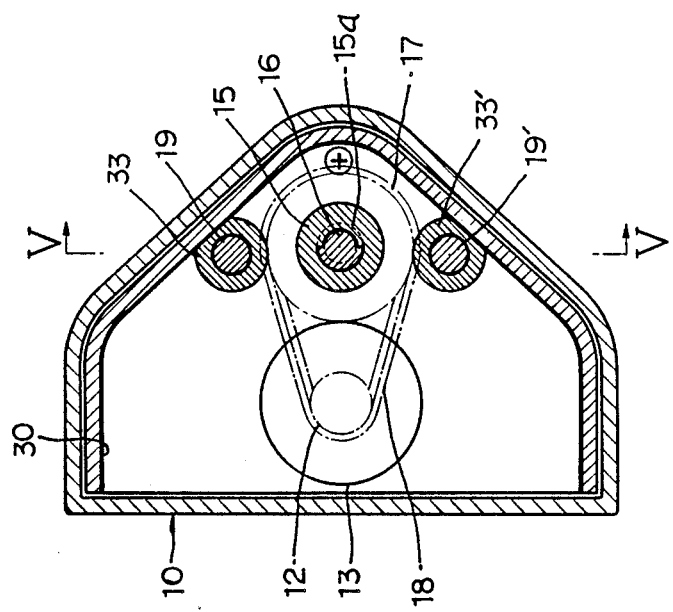
FIG. 4 is a cross sectional view taken along with IV—IV line in FIG. 2.
Figure 3:
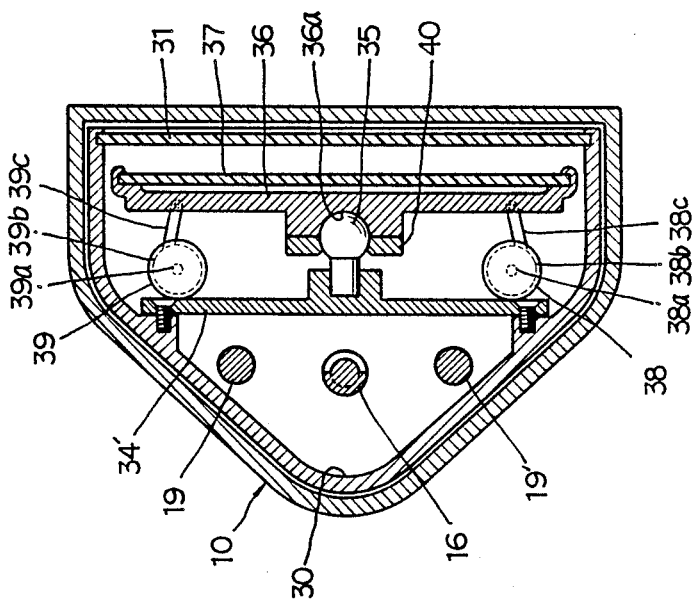
FIG. 3 is a cross sectional view taken along with III—III line in FIG. 2.
Figure 5:
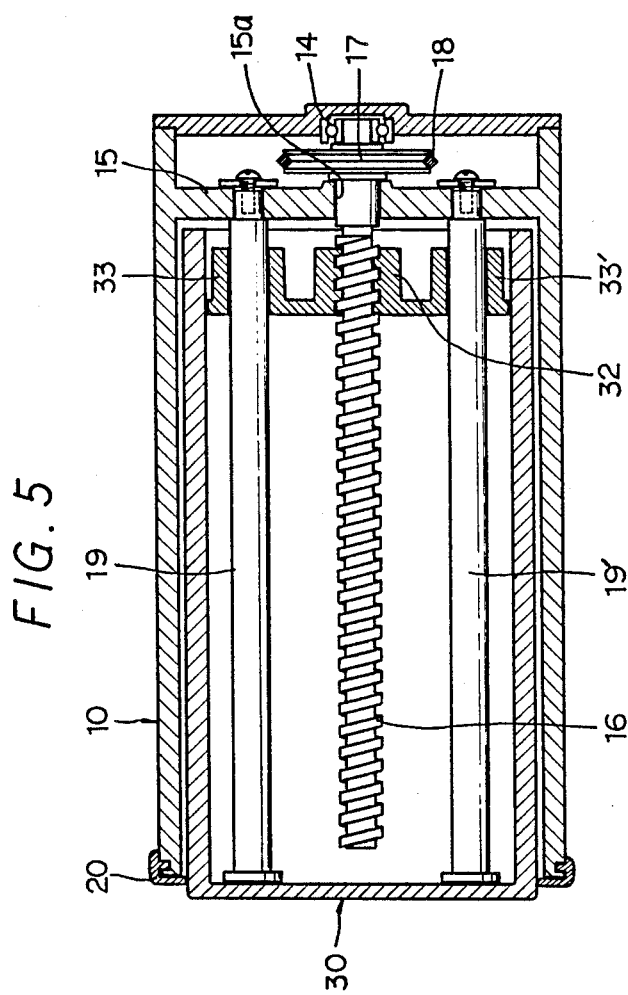
FIG. 5 is a cross sectional view taken along with V—V line in FIG. 4.
Figure 6:
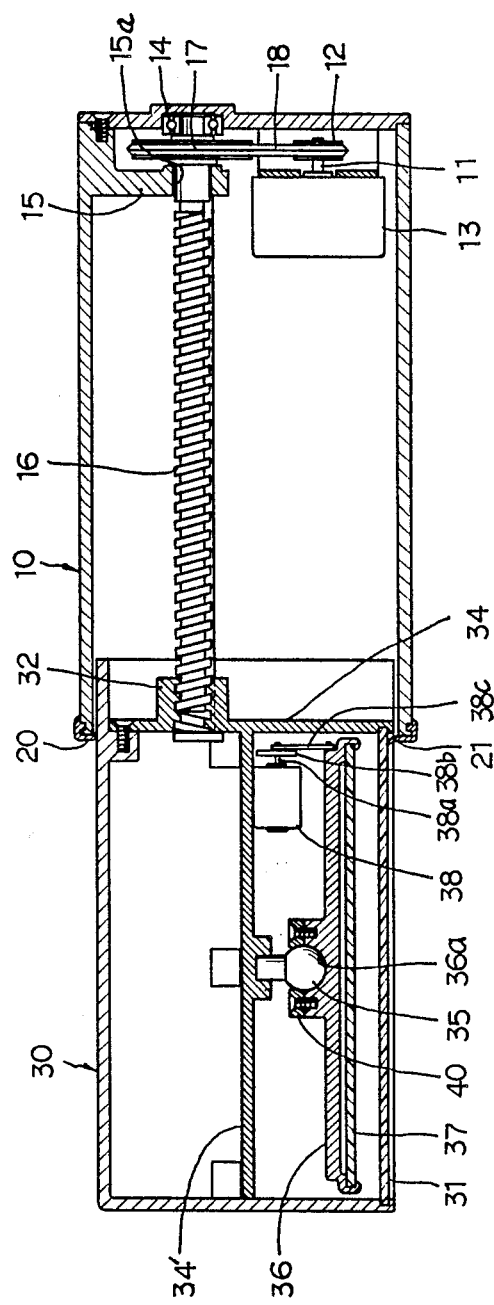
FIG. 6 is a cross sectional view showing a state of being cut in a longitudinal direction within a state of FIG. 1.

FIG. 2 is a longitudinal cross sectional view showing a state that the internal housing 30 is completely inserted into the interior of external housing 10, referring to this as well as FIGS. 3, 4 and 5 the constitution of an automatic rearview mirror for vehicles according to the present invention will be described in detail hereinafter.

A DC motor 13 for moving to right and left and capable of regular and reverse rotation mounted with a small pulley 12 at the end of rotary shaft 11 is mounted within the interior of closed end portion of said external housing 10, a screw shaft 16 being movably fixed with one end portion by a bearing 14 of opposite side wall of said motor 13 for moving and a shaft hole 15a formed at a supporting wall 15 is provided over almost entire length of external housing 10, and a large pulley 17 is fixed at an end portion of said screw shaft 16 located between said bearing 14 and supporting wall 15 and it is connected with said small pulley 12 with a belt 18. A pair of guide rods 19, 19' are disposed at both sides of said screw shaft 16 and they are fixed with their one end portions at the supporting wall 15.

An internal housing 30 being movably, and slidably inserted into the interior of said external housing 10 is fixed with protecting glass plate 31 at front surface, and a side wall plate 34 formed with a follower 32 to be engaged with said screw shaft 16 and bushes 33, 33' that guide rods 19, 19' being inserted respectively and guided and supported, is fixed with screws at the inner side end portion of said internal housing 30. A partitioning plate 34' formed integrally with said side wall plate 34 extended longitudinally at the center and perpendicular to said internal housing 30 is fixed with screws, a spherical pivot ball 35 is protruded and fixed at the central position of said partitioning plate 34', and a fixing plate 36 formed with semi-spherical recess 36a is pivotably fixed on said spherical pivot ball 35 opposite to said partitioning plate 34' so as to be faced outwardly. A mirror plate 37 is attached to the front surface of said fixing plate 36 to be maintained a predetermined distance with said protecting glass plate 31. First and second servomotors 38, 39 for adjusting the angle of mirror plate 37 are respectively provided at both sides of one end portion of said partitioning plate 34'. Rotary disks 38b, 39b are fixed to rotary shafts 38a, 39a of said first and second servomotors 38, 39, and they are respectively connected at both end sides of one end edge portion of said fixing plate 36 by levers 38c, 39c. Protrusions are respectively formed on the outer surface of said rotary disks 38b, 39b and they are respectively inserted into holes formed at each end of said levers 38c, 39c so that angle of mirror plate 37 can be adjusted in response to the rotational angle of said servomotors 38, 39 respectively.

Further, packing 20 and scraper 21 made of soft rubber material are attached over entire peripheral circumference at inside of opening end of said external housing 10, so that in case that the internal housing 30 is slidably moved to interior or exterior of the external housing 10 by the rotation of the motor 13 for moving, they can serve a function of sealing therebetween and a function of scraping the surface of the protecting glass plate 31. In the drawings, a reference numeral 40 is a fixing piece for coupling the semispherical recess 36a of the fixing plate 36 with the spherical pivot ball 35.

Figure 7:
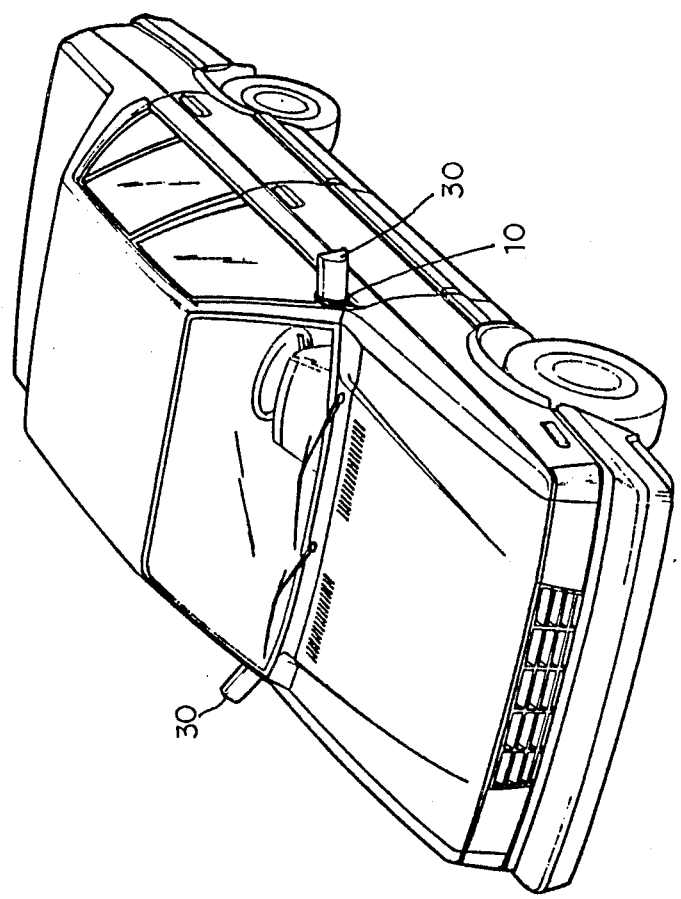
FIG. 7 is a perspective view showing a state that the automatic rearview mirror of the present invention is mounted to a vehicle.

This automatic rearview mirror of the present invention thus constructed can be not only mounted to the front quarter vent of vehicle, as shown in FIG. 7 but also to the bonnet, and in order to mount them to a vehicle, though it is not shown in the figures, either grooves for fixing or protruding tracks or the like can be provided on the surface of the opening portion of the external housing 10, or other optional fixing means can be attached.

Furthermore, in order to avoid damages in case of receiving an external shock in a state that the internal housing 30 being protuded to the exterior of car body during car running, forming the side wall plate with double structure composed of two plates, and they can be coupled by utilizing certain means such as springs, connecting plates, engaging protrusions and engaging grooves between each side wall plates.

Moreover, instead of said guide rods 19, 19' and said bushes 33, 33', even when guiding protrusions and grooves are formed on the external surface of the internal housing 30 and the internal surface of the external housing 10 contacting therewith longitudinally, similar function can be carried out.

Said motor 13 for moving and said servomotors 38, 39 for adjusting the angle are respectively connected to the power source of vehicle and their operation is carried out by handling of switches provided at convenient location of driver's seat, however, illustration is deleted because circuit configuration for their wiring and switch connection is well known technique to those skilled in the art.

In addition, in a preferred embodiment of the present invention as described above, though the rotary disks 38b, 39b are employed as a means for adjusting the angle of the mirror plate 37 by turning the servomotors 38, 39, instead of these, even if the rotary shafts 38a, 39a of the servomotors 38, 39 are formed into a crank shaft type and each end portions of respective levers are linked to them, similar effect can be obtained.

The operations and effects of the present invention thus constructed will be described in detail hereinafter. For example, in the case than an automatic rearview mirror of the present invention is provided to the front quarter vent of car body, the external housing 10 is mounted in a state of locating at inner side of said front quarter vent, and in a state that the internal housing 10, the outside end portion thereof becomes located at the inside than the extreme outside end portion of vehicle, i.e., a moulding attached to a side surface of usual vehicle body.

In the case that it is intended to draw out the internal housing 30 attached with the mirror plate 37 to the exterior of the external housing 10 under this condition, when the motor 13 for moving is rotated by the manipulation of switch, the rotational power is transferred to the large pulley 17 though the small pulley 12 through the belt 18, and then the power rotates the screw shaft 16 by decreasing with an appropriate speed ratio. And, in response to the rotation of the screw shaft 16, the follower 32 engaged therewith is moved to leftward based on FIG. 2, accordingly, the internal housing 30 is slidably moved to the exterior of the external housing 10.

At this moment, the displacement of the internal housing 30 can be carried out with safety movement because it is supported by the guide rods 19, 19' inserted in the bushes 33, 33' formed to the side wall plate 34, and when it is sufficiently drawn out, though it is not shown in figures, the proceeding is halted and the housing is stopped by a limit switch or limiting protrusion of generally well known means.

Either in case of parking in a state that the mirror plate 37 of the rearview mirror is drawn out to the exterior as this, or in case of intending to draw back the rearview mirror to the interior of vehicle upon crossing with proximating other vehicle, the process can be carried out by rotating the motor 13 for moving oppositely to above-described direction. Thus, in case that the internal housing 30 is slidably moved within the external housing 10, since the protecting glass plate 31 attached to the front surface on the internal housing 30 is scraped and cleaned by the scaper 21 made of soft rubber material attached to the opening end edge portion of the external housing 10, the contaminant such as dust is removed and constant clean condition can be maintained, particularly, even if rain or snow is smeared on the glass plate 31 during car running, since these become cleaned easily, the car running safety can be greatly improved.

On the other hand, in case of intending to adjust the angle of the mirror plate 37 so as to fit with the sight of driver, when first servomotor 38 or second servomotor 39 is rotated as much as predetermined angle by the manipulation of switch, the levers 38c or 39c pushes or pulls the fixing plate 36 in response to the rotational angle thereof, accordingly the fixing plate 36 rotates in a desired direction of right, left, forward and rearward around the spherical pivot ball 35, therefore, the adjusting of pertinent angle for a driver can be obtained.

The automatic rearview mirror for vehicles of the present invention as described above in detail is capable of drawing in and out the rearview mirror into or out of the interior or exterior of a rearview mirror causing from the contact with other physical object can be avoided; and the protecting glass plate is cleaned by the scaper upon moving the rearview mirror slidably to the interior and exterior of the external housing in case that the sight of rearward is interrupted by smearing with dust, rain or snow, therefore the effect of improving the car running safety can be obtained.

Further, since the angle adjustment of the rearview mirror can be carried out by the manipulation of switch in a state that a driver is seating on the driver's seat, the rearview mirror angle can be adjusted to optimum angle for a driver, therefore, there is also an effect that the adjusting operation becomes remarkably simplified.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. An automatic rearview mirror for vehicles comprising:
    an external housing having an open end portion and a closed end portion fixed to the interior of a vehicle body;
    a DC motor capable of rotating in either direction and is fixed within the closed end portion of said external housing, and a small pulley is fixed at the end portion of the rotary shaft of said motor;
    a bearing means fixed to a side wall of said external housing;
    a supporting wall formed with a shaft hole which protrudes downwardly at the interior of said closed end portion of said external housing;
    a screw shaft supported rotatably with its one end portion by said bearing means and said shaft hole of said supporting wall
    a large pulley fixed to one end portion of said screw shaft located between said bearing means and said supporting wall;
    a belt means for connecting said small pulley with said large pulley;
    guide rods at one end to the supporting wall and positioned longitudinally adjacent to said screw shaft;
    an internal housing movably inserted in a sliding manner into the interior of said external housing;
    a protecting glass plate fixed on a front surface of said internal housing;
    a side wall plate fixed to an inner side end portion of said internal housing with a follower to be meshed with said screw shaft and two bushings in which said guide rods are inserted therein, respectively;
    a partitioning plate fixed longitudinally at the central portion of said internal housing and perpendicularly to said side wall plate by screws;
    a spherical pivot ball fixed at the center of said partitioning plate outwardly;
    a fixing plate formed with a semi-spherical recess to be coupled pivotally to said spherical pivot ball at the center position of the rear side thereof, and is supported pivotally in the spherical surface of said pivot ball and semi-spherical recess;
    a mirror plate attached to the front surface of said fixing plate and maintained at a predetermined distance with said protecting glass plate;
    first and second servomotors for angle adjustment or said fixing plate and are respectively mounted at both sides of one end portion of said partitioning plate;
    rotary disks are respectively attached to the rotary shafts of said first and second servomotors; and
    lever means connected between the outer surface of said rotary disks and said fixing plate.

2. An automatic rearview mirror for vehicles according to claim 1, wherein a packing contacts the peripheral surface of the internal housing, and a scraper contacts the protecting glass plate, said packing and scraper both are provided at the edge of said open end portion of said external housing.

3. An automatic rearview mirror for vehicles according to claim 2, wherein said packing and scraper both are made of soft rubber material.

4. An automatic rearview mirror for vehicles according to claim 1, wherein said side wall plate of said internal housing is formed with double structure composed of two plates, and having coupling means to release or engage said plates.

5. An automatic rearview mirror for vehicles according to claim 1, wherein said rotary shafts of said first and second servomotors are of a crank shaft type.

* * * * *